United States Patent [19]
Patterson

[11] Patent Number: 5,791,673
[45] Date of Patent: Aug. 11, 1998

[54] FRAME HAVING A CENTRAL BACKBONE AND OPPOSING SKINS

[75] Inventor: Thomas C. Patterson, Westport, Conn.

[73] Assignee: Cannondale Corporation, Bethel, Conn.

[21] Appl. No.: 651,581

[22] Filed: May 22, 1996

[51] Int. Cl.[6] ................................. B62K 19/08
[52] U.S. Cl. .................... 280/281.1; 280/226.1; 280/288.3; 280/274
[58] Field of Search ............ 280/226.1, 284.4, 280/281.1, 288.3, 274; 74/594.1, 594.2; 301/64.1, 64.2, 104; 138/120, 157, 158, 166, 167; 248/230.8, 295.11, 316.1; 224/427, 448

[56] References Cited

U.S. PATENT DOCUMENTS

| | | |
|---|---|---|
| Re. 33,295 | 8/1990 | Trimble . |
| 763,898 | 6/1904 | Hoskins ................. 138/158 |
| 3,533,643 | 10/1970 | Yamada . |
| 3,862,779 | 1/1975 | Jayne ................. 301/64.2 |
| 4,067,589 | 1/1978 | Hon . |
| 4,479,662 | 10/1984 | Defour et al. ............ 280/281.1 |
| 4,548,422 | 10/1985 | Michel et al. . |
| 4,550,927 | 11/1985 | Resele . |
| 4,593,929 | 6/1986 | Williams . |
| 4,777,072 | 10/1988 | Cason, Jr. ............. 138/158 |
| 4,798,318 | 1/1989 | Irwin . |
| 4,850,607 | 7/1989 | Trimble . |
| 4,865,337 | 9/1989 | Disler et al. . |
| 4,889,355 | 12/1989 | Trimble . |
| 4,923,203 | 5/1990 | Trimble et al. . |
| 5,011,172 | 4/1991 | Bellanca et al. . |
| 5,072,961 | 12/1991 | Huppe ................. 280/288.4 |
| 5,092,614 | 3/1992 | Malewicz . |
| 5,221,102 | 6/1993 | Spangler ............... 280/281.1 |
| 5,253,888 | 10/1993 | Friedrich . |
| 5,435,869 | 7/1995 | Christensen ............ 74/594.1 |
| 5,451,071 | 9/1995 | Pong et al. ............ 280/288.3 |
| 5,456,481 | 10/1995 | Allsop et al. . |
| 5,464,240 | 11/1995 | Robinson et al. . |
| 5,609,070 | 3/1997 | Lin et al. ............. 74/594.1 |
| 5,623,856 | 4/1997 | Durham ............... 74/594.1 |

FOREIGN PATENT DOCUMENTS

| | | | |
|---|---|---|---|
| 323543 | 7/1989 | European Pat. Off. ...... 280/281.1 |
| 32095 | 9/1904 | France ................ 280/281.1 |
| 7465 | of 1886 | United Kingdom .......... 280/281.1 |
| 2278814 | 12/1994 | United Kingdom .......... 280/281.1 |

Primary Examiner—Harry C. Kim
Assistant Examiner—John L. Beres
Attorney, Agent, or Firm—Pennie & Edmonds LLP

[57] ABSTRACT

The present invention is directed to an improved frame construction for transmitting in-plane and out-of-plane loads between a plurality of components and maintaining the components in spacial relation. The frame is comprised of a plurality of node members for interconnection with the components and a plurality of beams and skin members interconnecting the node members. The beams include two channels on opposing sides for receiving the outer edges of the skin members. Preferably, the node members and beams form a perimeter channel that extends substantially around the entire perimeter of the frame and the skin members are secured thereto.

37 Claims, 16 Drawing Sheets

FRAME HAVING A CENTRAL BACKBONE AND OPPOSING SKINS

FIELD OF THE INVENTION

This invention relates generally to frames for interconnecting two points and transmitting in-plane and out-of-plane loads therebetween. More particularly, the invention is directed to a bicycle frame and components.

BACKGROUND OF THE INVENTION

Conventional bicycle frames use metal tubes welded into closed frameworks to interconnect the components (front fork/handlebar assembly, seat, crankset, rear wheel) and transmit the loads therebetween. The metal tubes keep the components in spacial relation, i.e., they maintain the components relative proximity. Moreover, the metal tubes bear the in-plane and out-of-plane loads between the components.

The traditional bicycle frame comprises: a top tube connected at its front end to the top of the relatively short head tube, and extending generally horizontally backward to the top of the seat tube; a down tube connected at the front end to the bottom of the head tube and extending downwardly and rearwardly to the bottom bracket where the seat tube and the down tube are connected; and pairs of chain stays and rear wheel stays extending backward to dropouts which support the rear wheel axle. This conventional frame design is called the "diamond" frame, because when viewed from the side, the top tube, down tube, chain stays, and rear wheel stays enclose a diamond-shaped space.

Such frames require that the entire frame be re-designed for the different size frames required to accommodate riders of different heights. This includes determining the tube lengths needed for the proper spacing of the bicycle component, cutting the tubes accordingly, determining the tube joint angles, and accordingly welding or brazing the tubes together. This method is time consuming and costly, both in terms of design and manufacturing complexity. Therefore, it is desired to have a frame that is easier to manufacture, particularly when manufacturing different frame sizes.

Furthermore, conventional tube frames are relatively heavy, since they are formed from the extrusion or rolling and seaming of metal alloys. Finally, conventional tube frames are limited in terms of aerodynamic improvements, as they are restricted to the use of tubes of generally circular cross-sections.

It is known to manufacture bicycle frames entirely from composite materials such as in U.S. Pat. No. 4,889,355 to Trimble, wherein the frame is constructed using an internal pressure mold to form composite tubes. However, this manufacturing method does not take advantage of the use of different materials or appropriate configuration to bear the different loads to which a bicycle frame is subject to in use.

Another example of a frame known in the art is seen in U.S. Pat. No. 5,456,481 to Allsop, et al., which discloses a frame having right and left body units which mate directly to each other. All structural elements of the frame are formed from the same material. Again, this manufacturing method does not take advantage of the use of different materials or appropriate configuration to bear the different loads to which a bicycle frame is subject to in use. Therefore, there is a need for a bicycle frame having separate structural elements manufactured such that the various elements take advantage of the different properties of the materials or configurations, thus permitting the most efficient possible frame for all expected loads.

In the conventional bicycle frame design, the seat support is designed integral to the seat tube: the top of the seat tube is notched, and the notch is provided with a screw clamp. The inner diameter of the seat tube is selected to slideably receive a standard seat post, and the clamp is tightened to secure the seat post in the desired vertical position. This conventional seat support design requires that the seat tube be bored to a very precise diameter so that it will accept the seat post, while at the same time not being so large as to require significant distortion of the seat tube's cross-sectional shape when the screw clamp is tightened. Furthermore, the use of a single screw clamp provides only a single point of support for the seat post. The inside diameter of the seat tube is by necessity larger than the outside diameter of the seat post, therefore there will be play between the seat post and the part of the seat tube below the clamp. In this situation, the single support leaves the seat post free to deflect or vibrate within the seat post tube in response to moments around that point of support. Therefore, it is desired to provide a seat support assembly which does not require precise machining, and which provides more than a single point of positive support for the seat post.

Thus, the need exists for a strong, lightweight bicycle frame which is easy to manufacture, which uses different materials in different parts of the frame to most effectively take advantage of the properties of those materials, which can easily accommodate different size frames using standard components, and having an improved seat support assembly.

SUMMARY OF THE INVENTION

The present invention is directed to an improved frame construction for transmitting in-plane and out-of-plane loads between a plurality of components and maintaining the components in spacial relation. The frame is comprised of a plurality of node members for interconnection with the components and beams and skin members interconnecting the node members. The beams include two channels on opposing sides for receiving the outer edges of the skin members. Preferably, the node members and beams form a perimeter channel that extends substantially around the entire perimeter of the frame and the skin members are secured thereto.

In one embodiment, the present invention is a bicycle frame having a central backbone with outer skins attached to both sides of the backbone. The central backbone is comprised of node members for interfacing with the bicycle components. More particularly, the frame includes a first node member that includes bearing races for receiving the steering/front fork assembly and a second node member for receiving the crank assembly. The frame further comprises a first plurality of beams interconnecting the first and second node members. The beams include two opposing channels for receiving the outer skins. Preferably, the central backbone is further comprised of a third node member for the seat assembly and a second plurality of beams extending from the seat assembly node to the first plurality of beams.

In this embodiment, the present invention provides a bicycle frame having a torque tube and a seat mast. The torque tube extends downward and backward from a front fork/steering support node member to a crank assembly/bottom bracket node member. The seat mast extends upward and backward from the torque tube and terminates at the seat support assembly node member. The frame is comprised of a backbone including nodes at the front fork/steering support region, the crank assembly/bottom bracket region and the seat support region and a plurality of beams interconnecting the nodes having opposing channels therein. The frame is further comprised of opposing skin members that are received in the beam channels. Preferably, the node members also include channels to form a perimeter channel that extends substantially around the entire frame for receiving the outer edges of the skin members.

The backbone may be manufactured as a single piece, out of various suitable materials and by various suitable processes. For example, the backbone may be formed by: CNC machined or cast metal or injection molded plastic.

The backbone may alternatively be constructed from several distinct pieces joined together. Separate node members for the steering support, seat support, and bottom bracket are made separately and connected via beams. Preferably, the connections between the nodes and beams are designed to overlap. The overlap of material provides a larger surface area for the joint, resulting in a stronger mechanical connection.

Each skin may be of a one-piece construction, or of multiple components. In a preferred embodiment, the skin members comprise torque tube skin members and seat mast skin members. The torque tube skin members provide an exterior sheath for the steering support region, the torque tube, and the bottom bracket region. The seat mast skin members provide a sheath for the seat mast, which extends from the torque tube to the seat support assembly. Most preferably, the seat mast skin members include curved flaps at the lower ends, which conform to and wrap around the torque tube, providing a large surface-to-surface connection between the skin pieces. Alternatively, the seat mast skin pieces may simply terminate at the torque tube, providing a simple edge-to-surface connection.

The skins may be affixed in the perimeter channel of the backbone by various appropriate techniques according to the materials used. Most preferably, an epoxy adhesive is used to adhere the skins to the beam channels.

The backbone and skin members may be made from a variety of suitable structural materials. Most preferably, the backbone is made from aluminum alloy 356, and the skin members are made from a carbon fiber/epoxy composite.

The present invention is also directed to a seat support assembly comprising an arm and at least one band clamp. The band clamp tightens around a standard seat post to frictionally engage the same against the arm, thus providing a lightweight, positive support and preventing vertical and rotational motion as well as vibration of the seat post.

BRIEF DESCRIPTION OF THE DRAWING

Preferred features of the present invention are disclosed in the accompanying drawings, wherein similar reference characters denote similar elements throughout the several views, and wherein.

DETAILED DESCRIPTION OF THE PREFERRED EMBODIMENT

Figure 1:
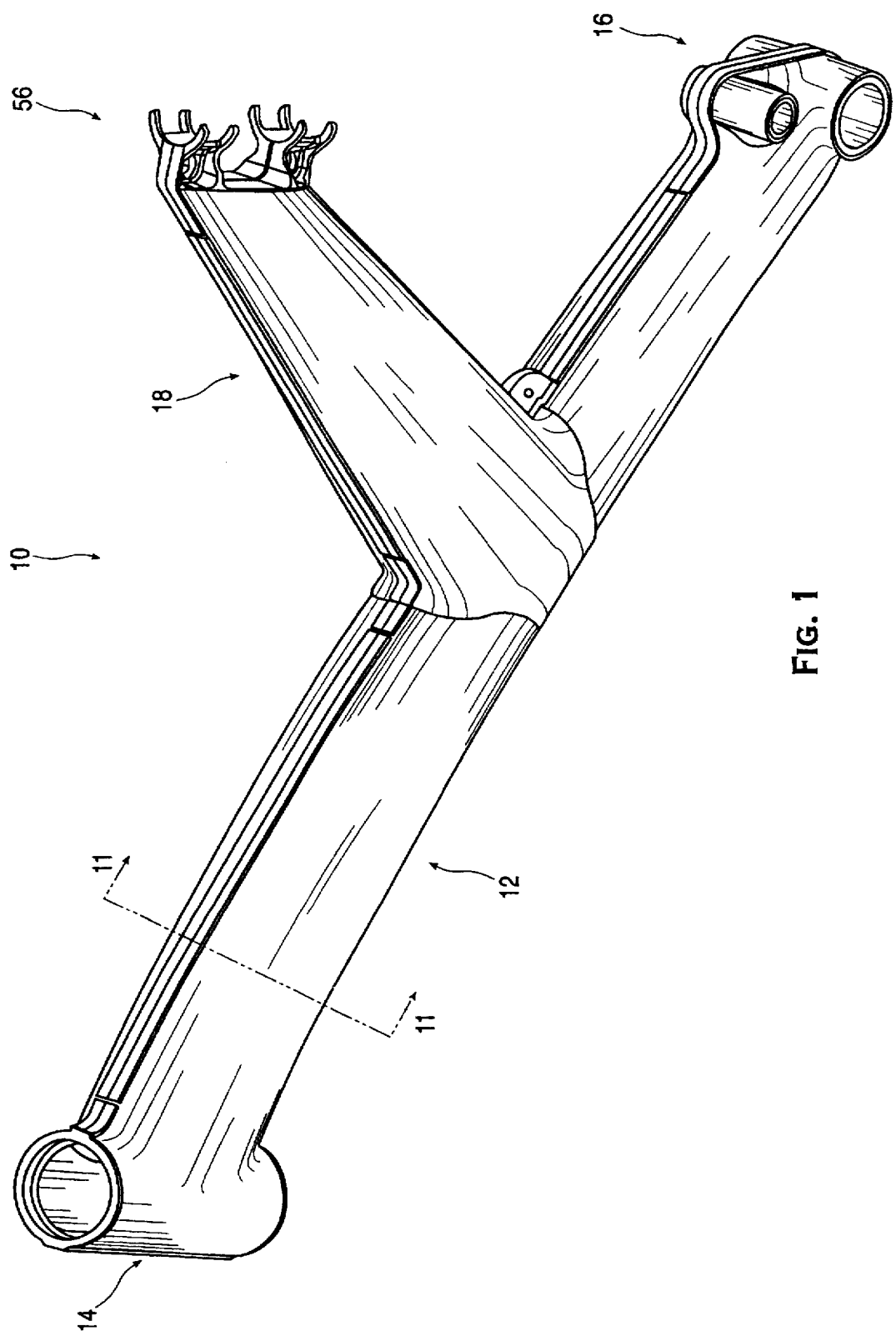
FIG. 1 is a perspective view of a bicycle frame in accordance with this invention.

FIG. 1 illustrates bicycle frame 10 in accordance with the present invention. The bicycle frame 10 is formed of a negative space frame design, i.e., the frame does not include a top tube. The frame consists of a torque tube 12, which extends from the steering support region 14 to the bottom bracket region 16 and a seat mast 18, which is attached to the torque tube and extends rearward and upward therefrom to seat support assembly 56. Preferably, the seat mast 18 is connected to the torque tube 12 between the steering support region 14 and the bottom bracket region 16.

The frame of the present invention accepts and interconnects components that are available in the industry, but the components do not constitute part of the invention. For example, the steering support 14 accepts a Cannondale HEADSHOK™ steering assembly or standard handlebar and front fork/wheel assembly, the seat support assembly 56 accepts a seat mounted on a standard seat post, and the bottom bracket 16 accepts a crankset and a rear swing arm/wheel assembly. These components are known in the art and, therefore, they are not illustrated in the figures.

Figure 2:
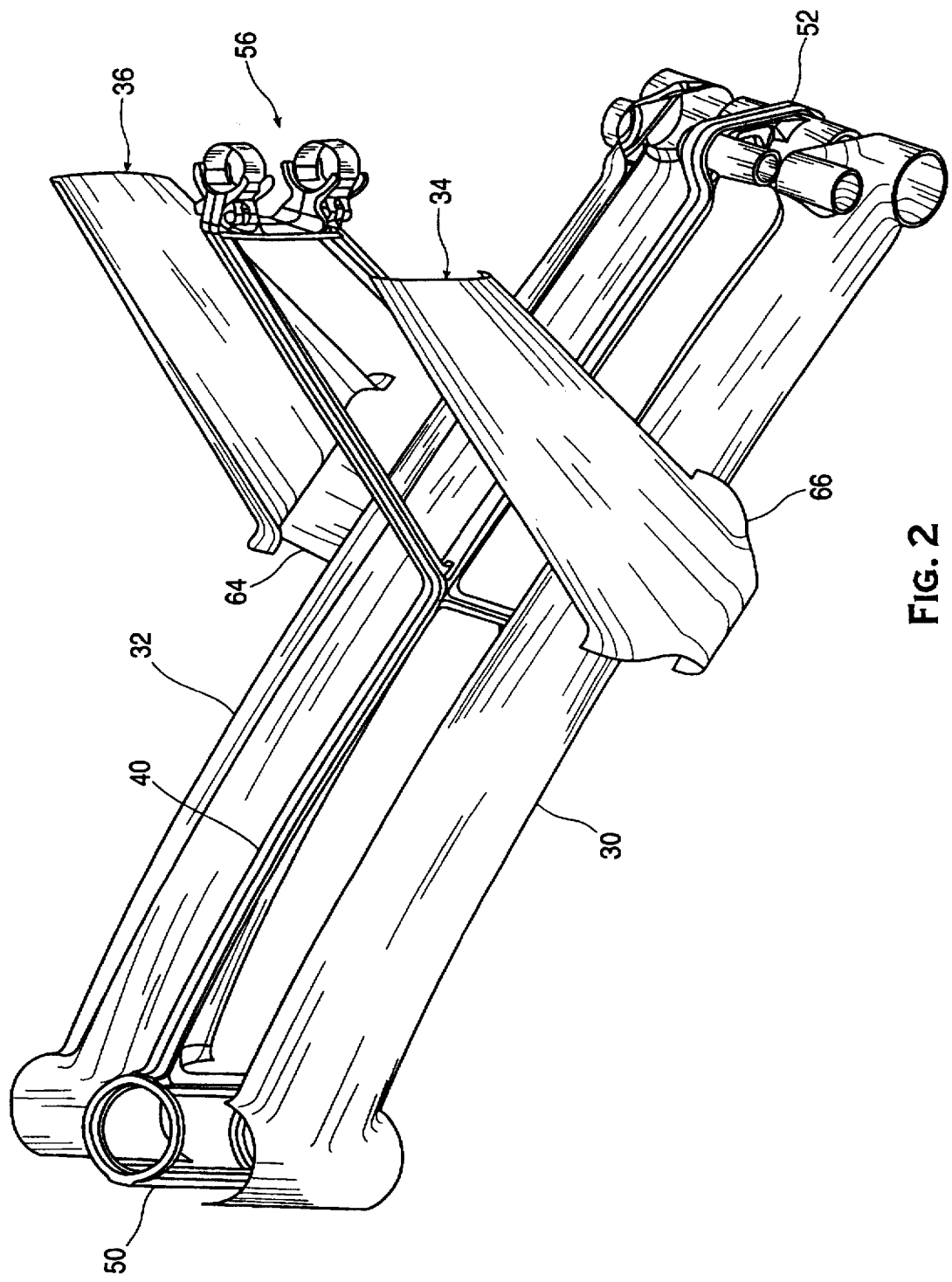
FIG. 2 is an exploded perspective of the frame of this invention.

As seen in the exploded view of FIG. 2, the bicycle frame is comprised of a central backbone 40 and skin members 30, 32, 34 and 36. The frame is constructed by joining the left torque tube skin member 30, left seat mast skin member 34, right torque tube skin member 32, and right seat mast skin member 36 to the central backbone 40 by securing the skin members to a perimeter channel formed in the backbone 40.

Figure 3:
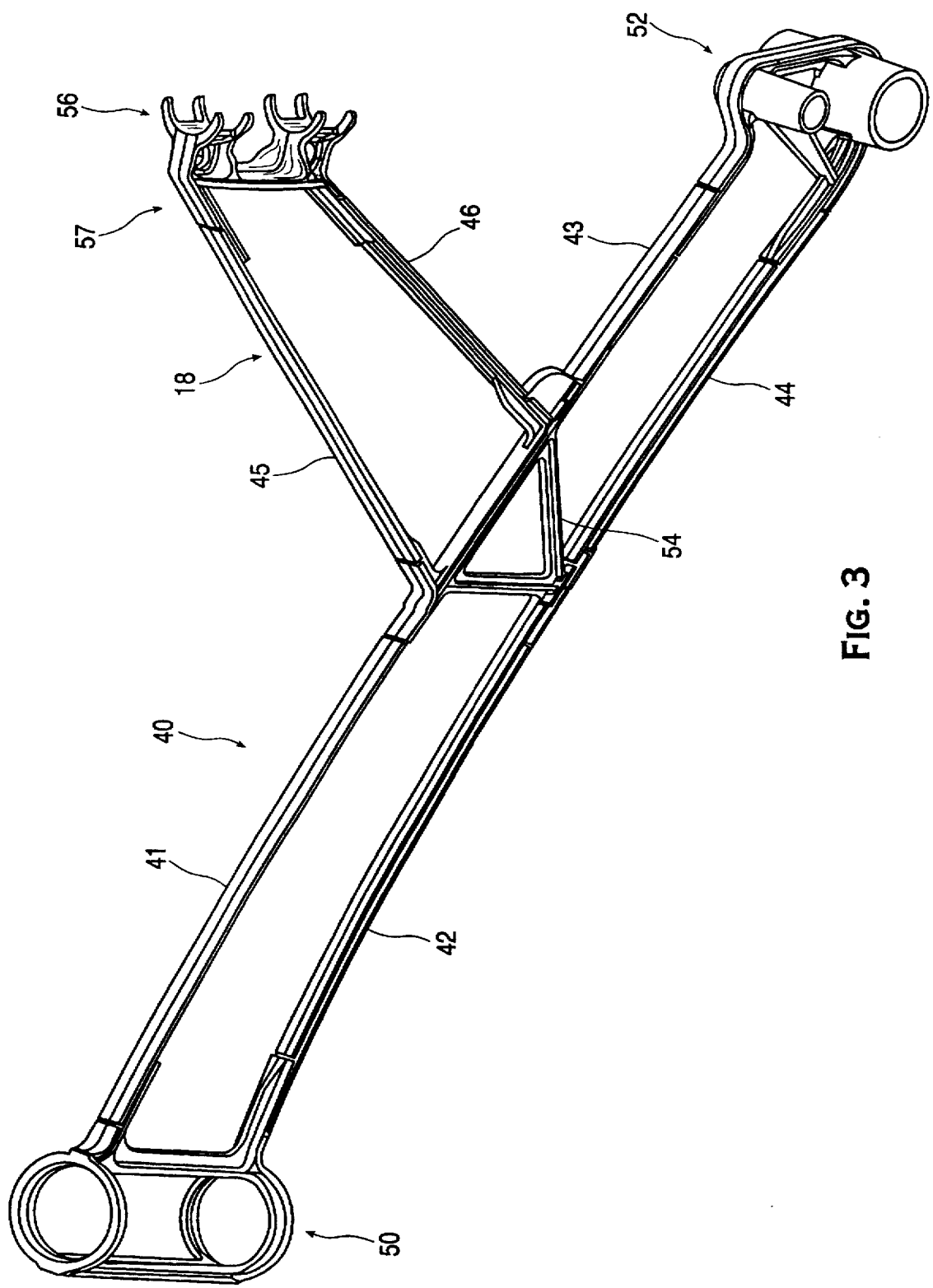
FIG. 3 is a perspective view of the backbone.

Referring to FIG. 3, the central backbone 40 comprises four nodal elements (center node 54, seat support assembly 56, steering support node 50, and bottom bracket assembly 52) connected by the various beams 41–46. The nodes 50, 52, 54 and 56 provide attachment locations for the various bike components that must be interconnected via a structural frame that bears the in-plane and torsional loads. This node-and-beam design minimizes the parts required for different sized frames by allowing the use of common nodes for all frames, simply using beams of different lengths to produce frames of the desired size. The backbone 40 is preferably an assembly of several parts joined together, as will be explained in more detail below. However, it is evident to one skilled in the art that the backbone could also be constructed as a single monolithic part.

The backbone of the present invention may be formed from suitable structural materials by the appropriate process. For example, it may be: cast or CNC machined from a light metal such as aluminum, titanium, or magnesium; injection or compression molded plastic; or molded fiber reinforced plastic such as fiberglass. In the preferred embodiment, the backbone is formed from cast aluminum, such as AL-365. Although the backbone of the illustrated embodiment incorporates a novel seat support assembly 56, it is evident to one skilled in the art that it could also incorporate a conventional tube-type seat support.

Loads are applied to the frame through the component node members. For example, forces from rider mass are applied through the seat support assembly 56, forces from rider steering and from the front wheel through steering support node 50, forces from the rear shock through the center node 22, and forces from pedaling and from the rear wheel through bottom bracket assembly 16. The backbone efficiently distributes and resists in-plane loads, through the placement of the interconnecting beams and cross-bracing trusses (FIG. 8A).

Figure 6:
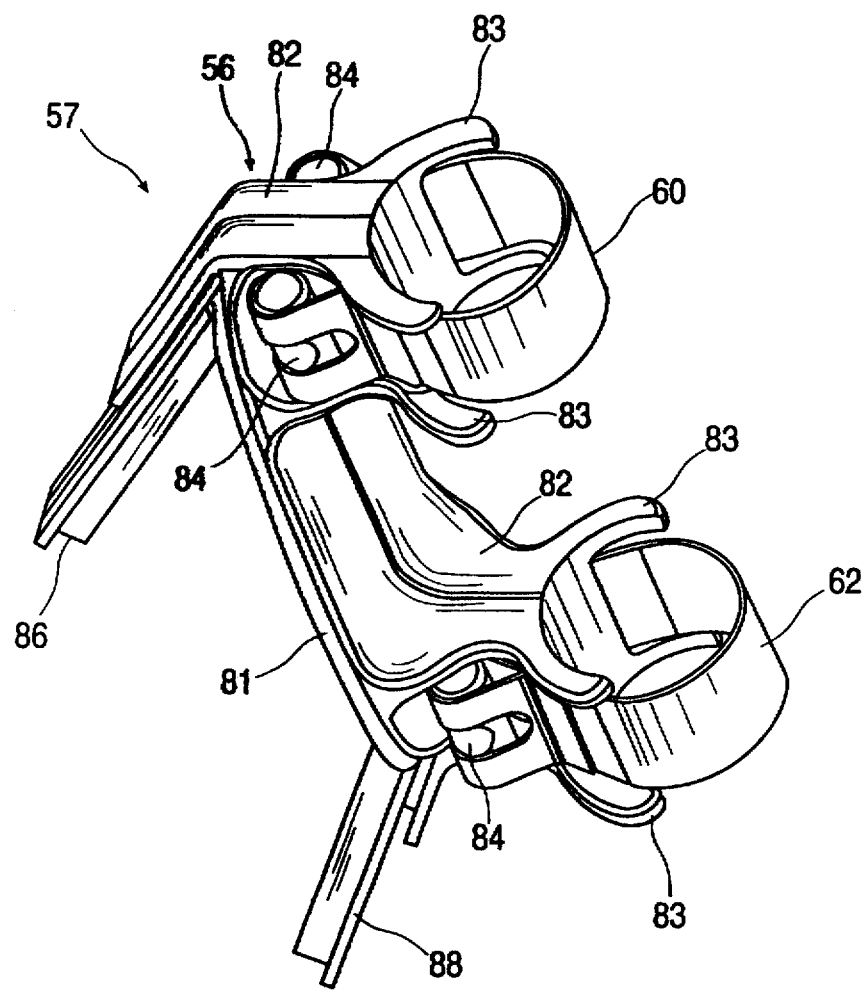
FIG. 6 is a perspective view of the seat support assembly.

FIG. 6 illustrates the seat support assembly 56 according to this invention. The seat support assembly consists of a pair of band clamps 60, 62 whose support is incorporated into the seat assembly node 57 of the backbone. This design allows ease of manufacture by eliminating the boring and reaming operations required to manufacture conventional seat support assemblies, and the associated difficulties of mating dimensional tolerances of the seat support assembly to the outside diameter of the seat posts.

The seat support assembly 56 is comprised of a plate 81 with beam members 86 and 88 extending rearwardly from the plate 81 to form part of the seat support node 57. A pair of spaced apart support arms 82 extend from the plate 81 from the opposite side of the beams 86 and 88. Extending from the arms 82 are a plurality of fingers 83. Preferably, each arm 82 has two spaced-apart pairs of fingers 83. Each pair of fingers 83 form a semicircle for abutting against the seat post (not shown) and supporting the same.

The band clamps 60 and 62 extend from the arms 82 to loop around and secure the bike seat post. Each end of the band clamps 60 and 62 includes a loop for receiving a barrel nut 84. Adjustment of the band clamps 60 and 62 is accomplished using the barrel nuts 84, which can be drawn together using a threaded bolt (not illustrated). The band clamps 60 and 62 are preferably made from stainless steel.

The seat support assembly 56 of the present invention uses a band clamp and preferably two band clamps 60 and 62 to provide substantially more support for the seat post than a conventional screw clamp device, without introducing any additional stress into the frame itself. By tightening at least one band clamp, the seat post is supported by a wide area. With more than one band clamp, the seat post is supported at two spaced-apart locations along its length, effectively preventing deflection and vibration of seat post within the support assembly 56.

Furthermore, the seat support assembly 56 of the present invention efficiently provides material at the locations where support is actually being given to the seat post. That is, the band clamps 60 and 62 along with supporting fingers 83 provide a secure attachment for the seat post and are light weight.

Figure 7:
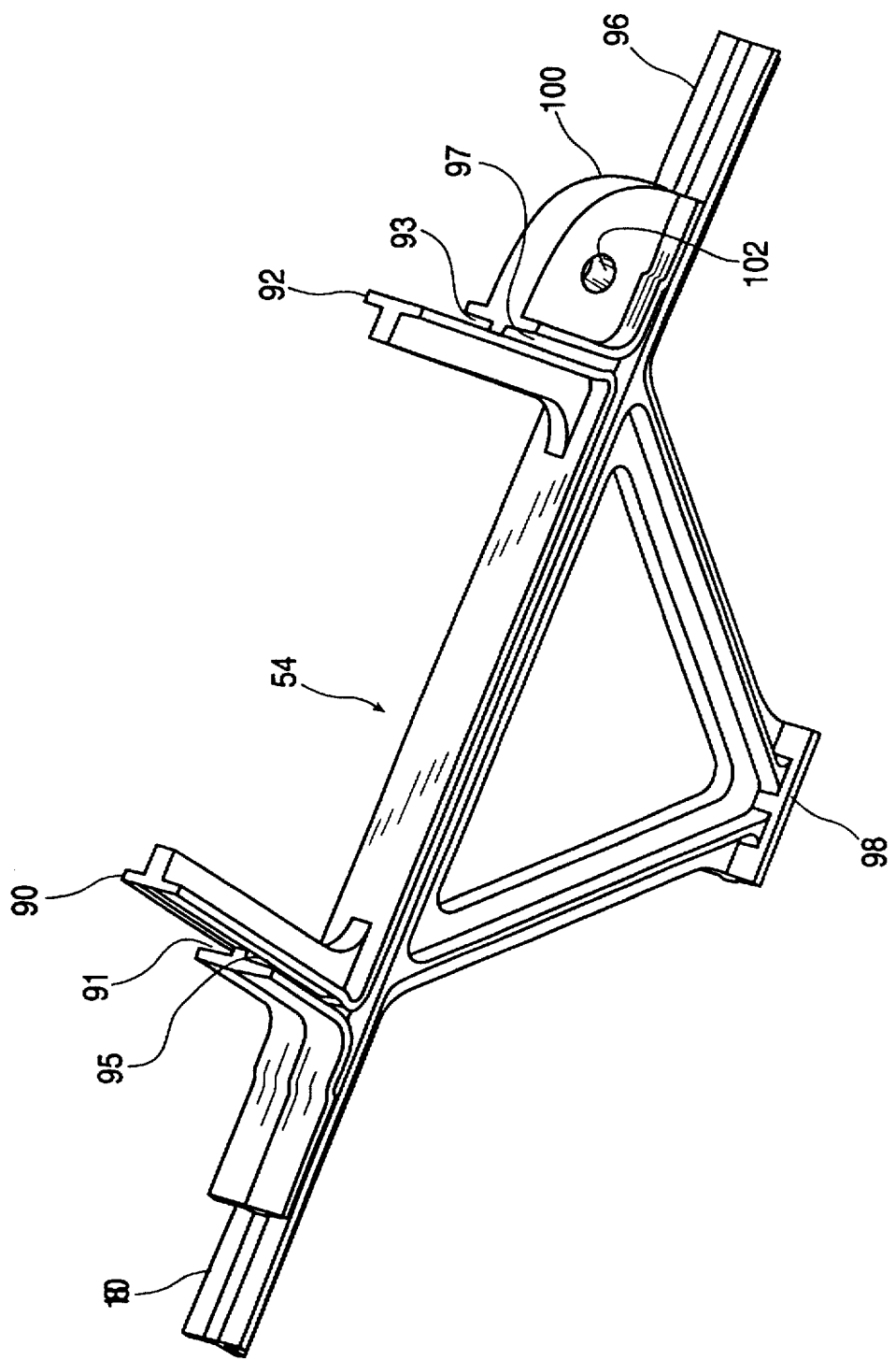
FIG. 7 is a perspective view of the center node.

The center node 54 of the backbone 40 is illustrated in FIG. 7. The center node 54 interconnects the seat mast 18 and the torque tube 12. The center node 54 is comprised of upwardly extending arms 90 and 92 to join cooperatively with the seat mast beams 45 and 46. Longitudinally extending arms 94 and 96 as well as lower corner point 98 are provided to join cooperatively with the torque tube beams 40, 43, 42, and 44. The upwardly extending arms 90 and 92 are provided with channels 91 and 93 which are designed to accept the side edges of the seat mast skins 34 and 36. Preferably, the lower corner point 98 is configured so as to provide channels having widths approximately twice that of the other channels generally. The double-width channels accept both the intermediate part of the bottom edge of the torque tube skins 30, 32 and the bottom edges of the curved flaps 64, 66 of the seat mast skin pieces.

The center node 54 also includes a rear shock mounting flange 100 behind the upwardly extending arm 92. The rear shock mounting flange 100 is provided with a through bore 102 to provide an attachment point for the rear shock absorber (not illustrated). The other end of the shock absorber is secured to the rear swing arm to dampen shocks to the rear wheel. In the most preferred embodiment, the shock mounting flange 100 is located at the point where the upwardly extending arm 92 and longitudinally extending arm 96 meet. It is evident to one skilled in the art that the location of the shock mounting flange 100 may be adjusted upwards along arm 92 or downwards along arm 96.

Figure 8:
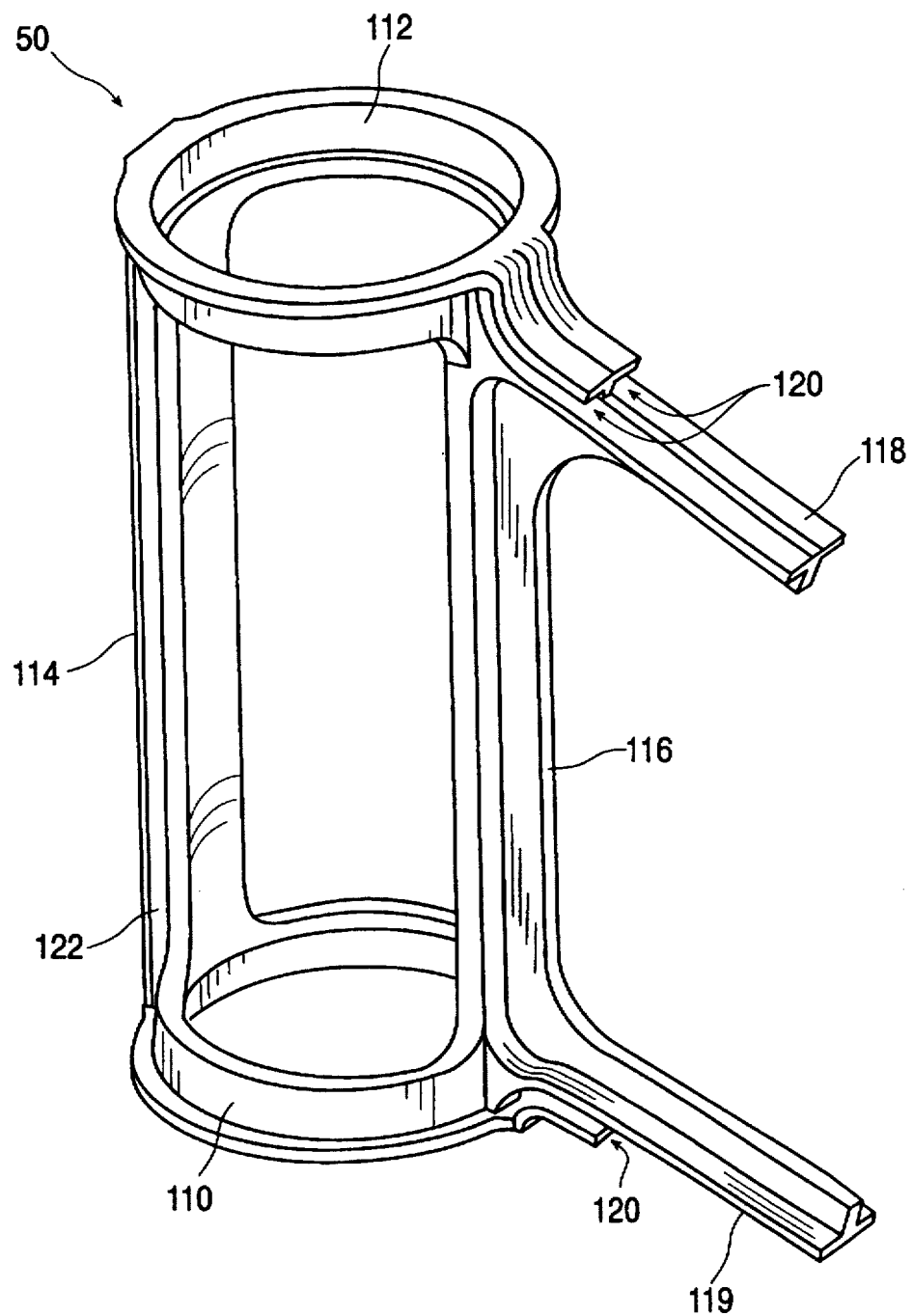
FIG. 8 is a perspective view of the steering support node.
Figure 8A:
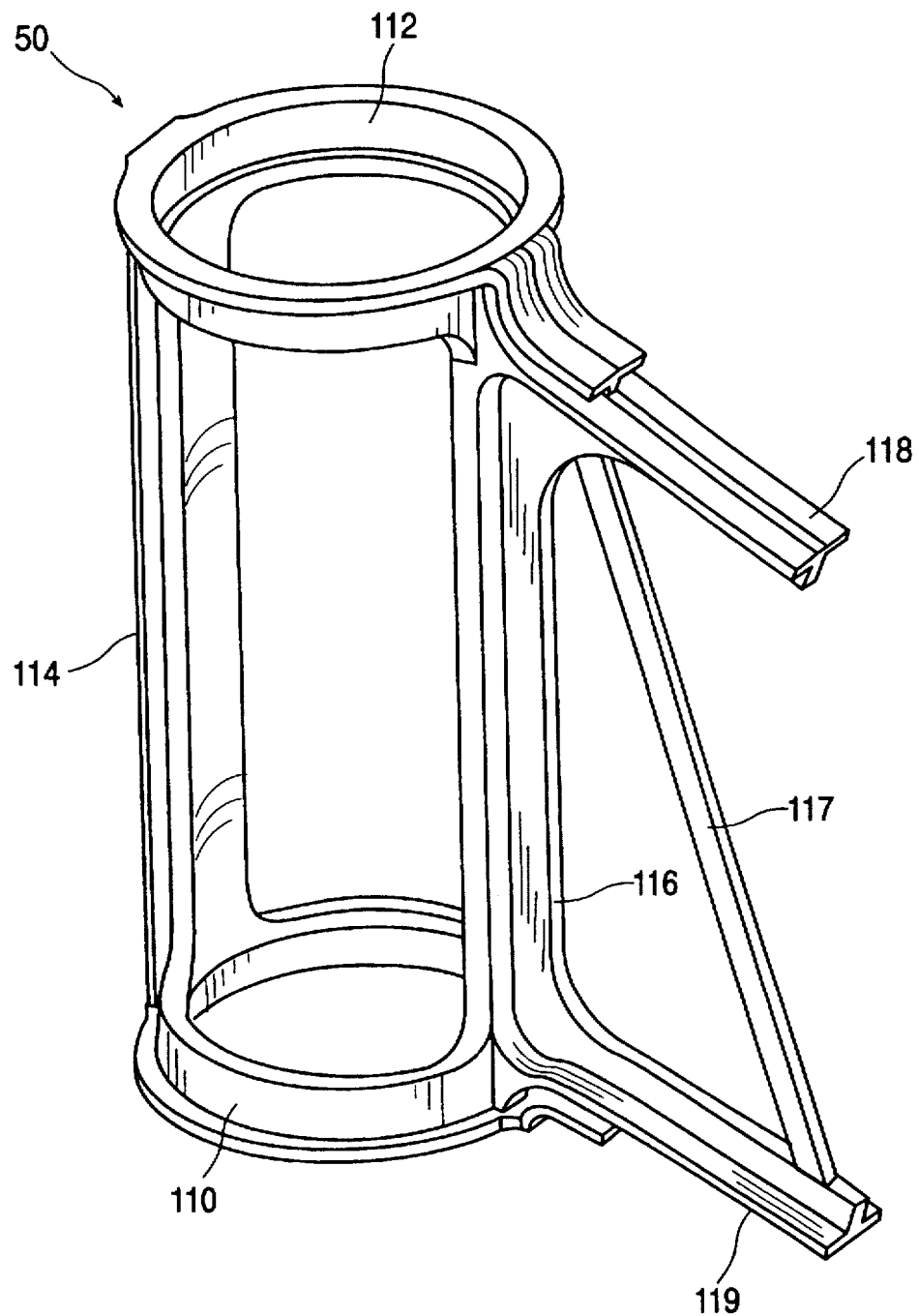
FIG. 8A is a perspective view of a second embodiment of the steering support node.

The steering support node 50 is illustrated in FIG. 8. It consists of upper and lower bearing supports 110 and 112 respectively and vertical support members 114 and 116. Arms 118 and 120 extend outward and downwardly from the steering support node 50 and provide cooperative coupling for the torque tube beams 41 and 42. The bearing supports 110 and 112 provide the interface between the frame and the steering components and front fork/wheel. Thus, the function of the steering support node 50 is similar to that of the head tube of a traditional frame.

The arms 118 and 119 and the vertical support member 114 include opposing channels 120 and 122 for receiving the edges and ends of the torque tube skins 30 and 32.

Referring now to FIG. 8A, a second embodiment of the steering support node 50 is disclosed. This embodiment is substantially similar to the first embodiment shown in FIG. 8, but is further comprised of a truss member 117 extending between arm members 118 and 119 for additional structural strength and stiffness.

Figure 9:
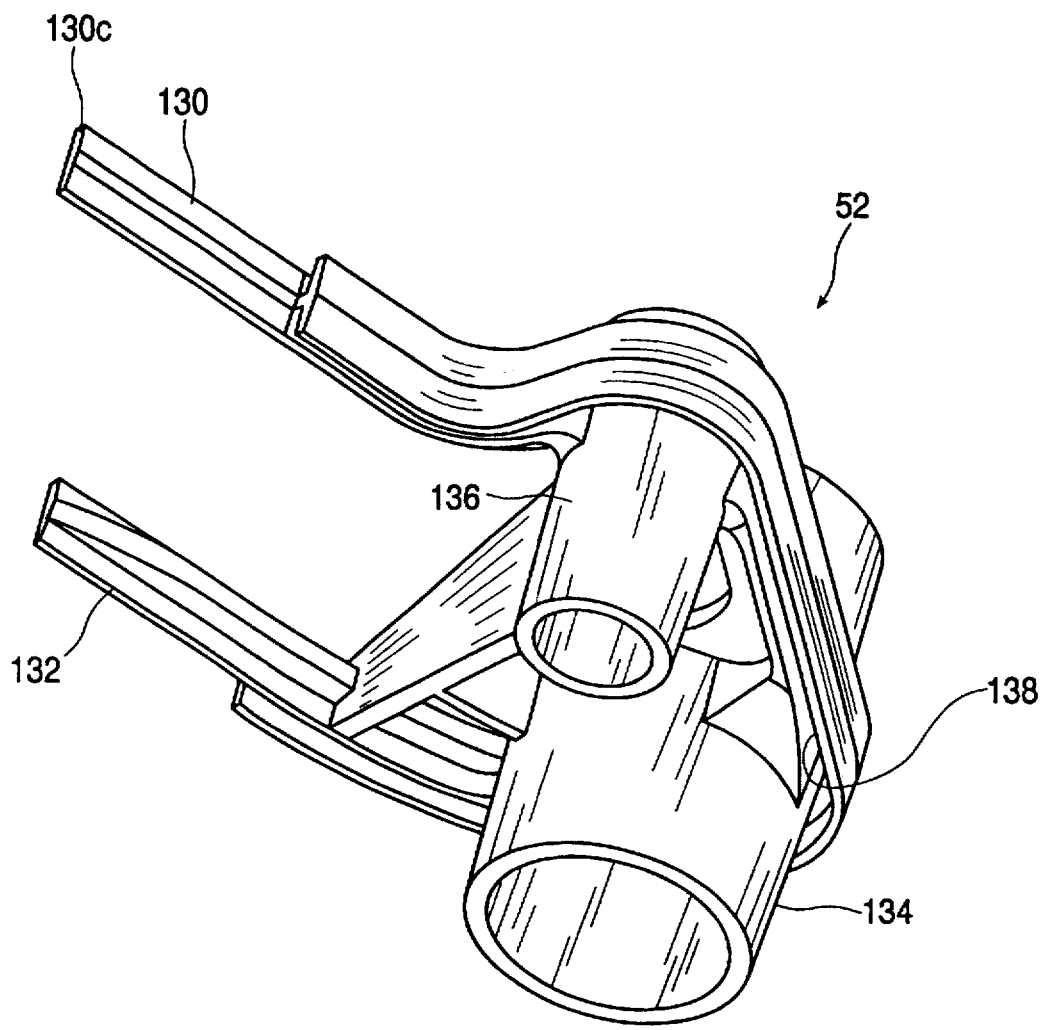
FIG. 9 is a perspective view of a beam member.

The bottom bracket node 52 is illustrated in FIG. 9. The pivot support 136 is provided for support of the rear swing arm. The pedal spindle support 134 is provided for mounting of the crankset. The bottom bracket node 52 has arms 130 and 132 extending outwardly and upwardly to provide cooperative joining with the lower torque tube beams 43 and 44 respectively. The bottom bracket node 54 also preferably includes a perimeter channel 138 to accept the edge of the lower portion of the torque tube skins 30 and 32.

Figure 10:
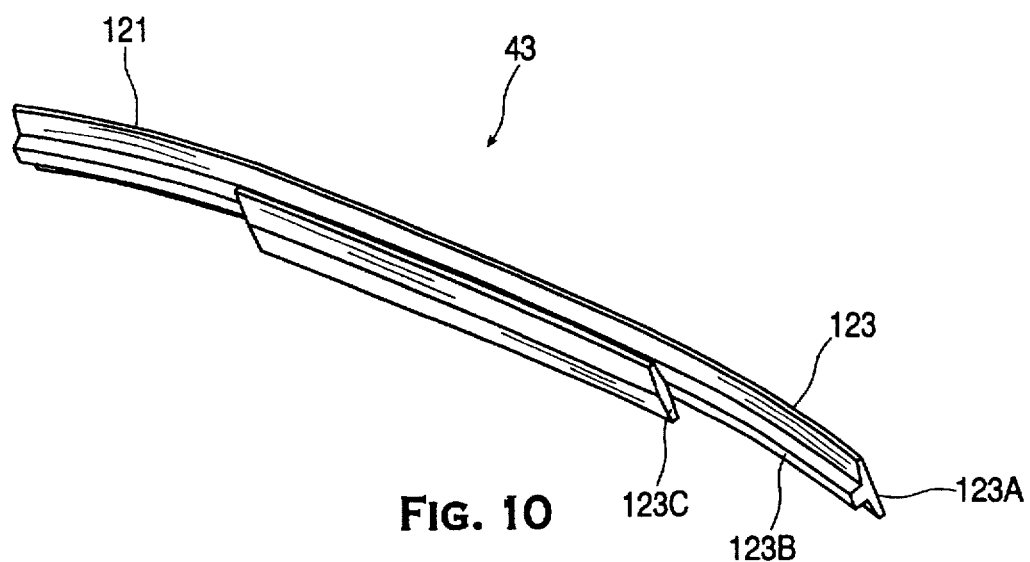
FIG. 10 is a perspective view of the bottom bracket node.

Having separately described the individual nodes 50, 52, 54 and 57 of the backbone, the construction of the unified backbone 40 can now be explained in detail with reference to FIG. 3. Preferably, the backbone nodes 50, 52, 54 and 57 are formed separately and joined via a plurality of beams 41, 42, 43, 44, 45 and 46. To improve the strength of the connections between the backbone components (nodes and beams), the nodes and beams are designed to overlap at connection sections, rather than to simply abut each other. For example, the arm 123 of the individual backbone beam member 43 seen in FIG. 10 overlaps and forms a continuous beam with arm 130 of bottom bracket assembly 50, seen in FIG. 9. More particularly, the backbone 40 is comprised of opposing peripheral channels that extend about substantially the entire periphery of the backbone 40 for receiving the frame skin members 30, 32, 34 and 36. The peripheral channels are formed of a vertical wall member, for example, 123B, extending perpendicularly between two parallel wall members, for example 123A and 123C. In the overlap sections, one of the parallel wall members is part of a node arm, for example 130C, and the other parallel wall member is formed by the beam, for example 123A. This overlap of parts contributes to the strength of the joint between the parts.

This mechanical overlap of the backbone pieces, together with the fact that the various pieces of the backbone are all positively affixed to the skins, provides a very strong overall frame system. Therefore, it is not necessary that the backbone pieces be positively affixed to each other. However, if the backbone pieces are affixed to each other, the large contact surface area in the joint will result in a strong mechanical connection. The various parts of the backbone may be joined to each other by sonic welding, conventional welding, brazing, adhesives, mechanical fasteners, or any other techniques appropriate to the materials used.

Figure 4:
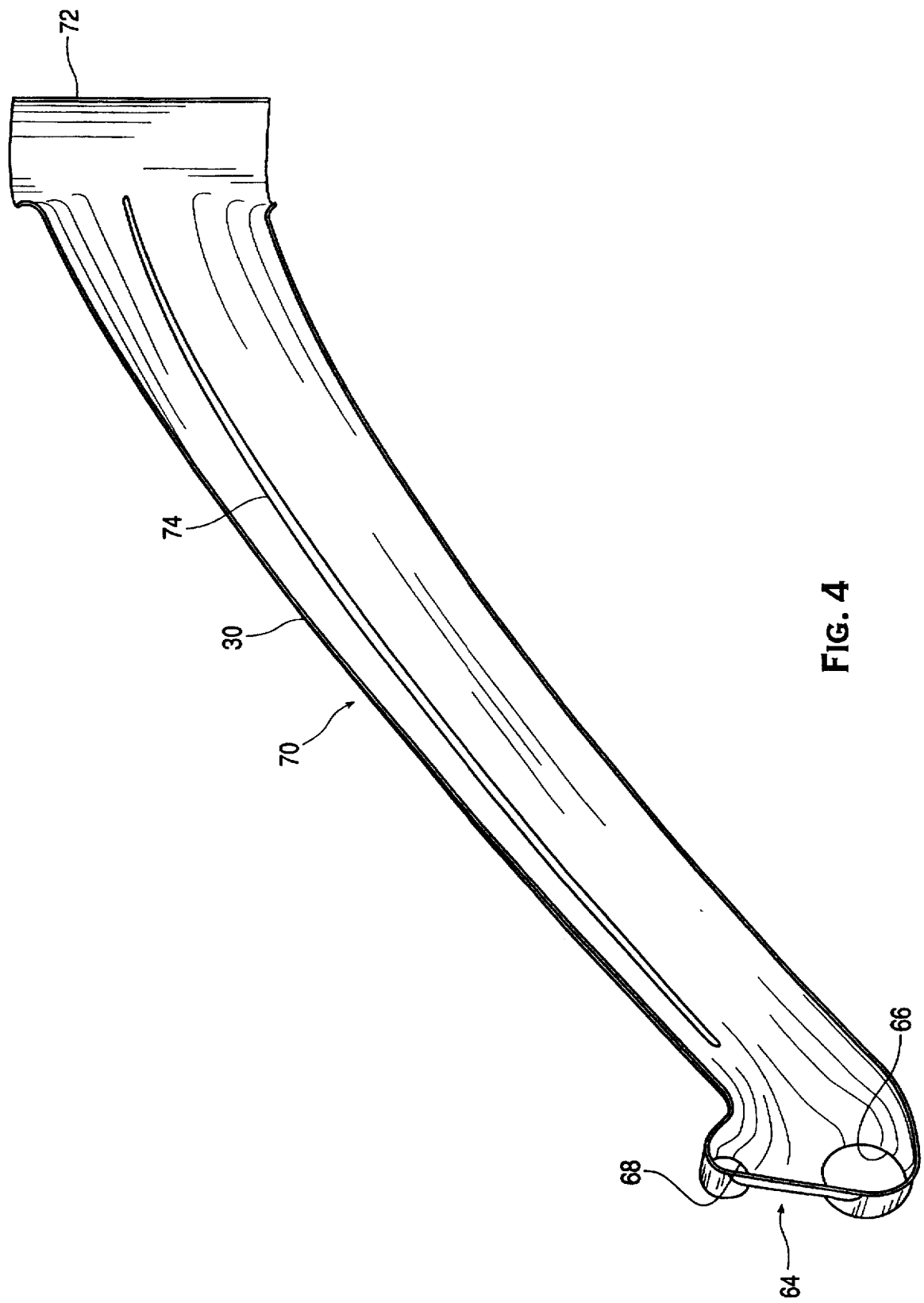
FIG. 4 is a perspective view of the left side torque tube skin.
Figure 5:
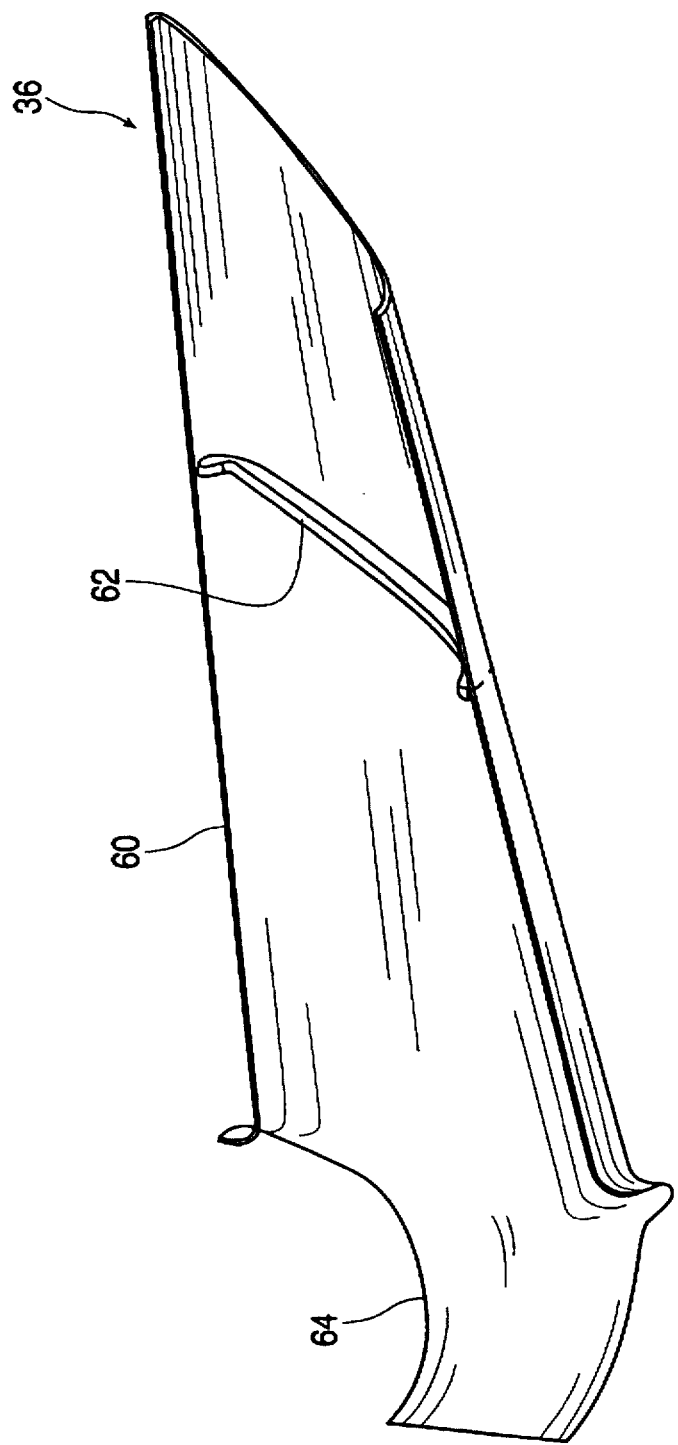
FIG. 5 is a perspective view of the right side seat mast skin.

Referring now to FIGS. 4 and 5, a left torque tube skin member 30 and a right seat-mast skin member 36, respectively, are shown. The skin members 30, 32, 34 and 36 consist of outer edges designed to fit into the channels that extend substantially around the perimeter of the backbone 40. In the preferred frame, the backbone is substantially enclosed by the skin members, with the exception of the outer flange of the backbone. The skin members provide in-plane and out-of-plane structural stiffness for the frame as well as improve the aerodynamics of the frame and advantageously reduce the risk of the accidental snagging of objects such as branches, etc. in the trusswork of the backbone.

The left skin and right skin of the preferred bicycle frame 10 are each formed from multiple members, i.e., the torque tube skin members 30 and 32 and the seat mast skin members 34 and 36. The torque tube skin members 30 and 32 provide an exterior sheathing for the torque tube 12. Similarly, the seat mast skin members 34 and 36 provide a sheathing for the seat mast 18. However, it is evident to one skilled in the art that the skins may also be formed as a single piece for each side.

In the preferred embodiment, the torque tube skin members 30 and 32 have a steering support region 72, a bottom bracket region 64 and an intermediate region 70 extending therebetween. The bottom bracket region 64 is provided with openings 66 and 68 to permit the fittings for the crankset and rear swing arm, respectively. The steering support region 72 substantially encloses the steering support node 50. The intermediate region 70 provides axial and torsional stiffness between the bottom bracket region 64 and the steering support region 72.

Figure 11:
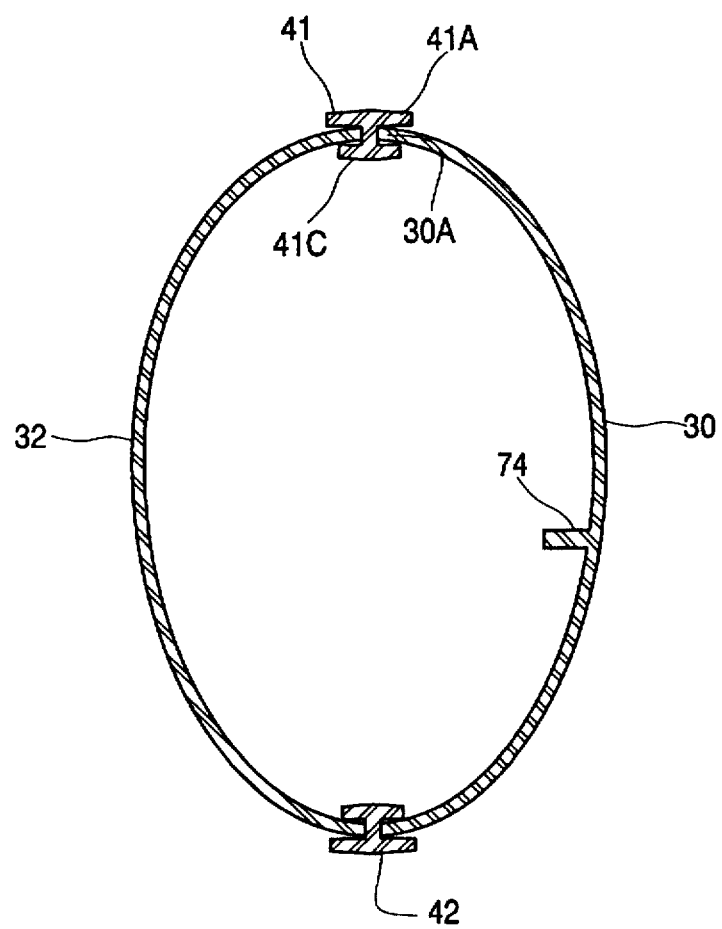
FIG. 11 is an enlarged sectional view of the torque tube taken along line 11—11 of FIG. 1.

FIG. 11 provides a cross-sectional view of the torque tube 12, including a detailed view of the backbone-to-skin joint. Preferably, the skin members 30, 32 are generally "C" shaped in cross-section, and are thin relative to the overall cross-sectional diameter of the torque tube. At this location in the frame, the backbone comprises the beams 41 and 42. The beams preferably include two parallel wall members and a perpendicular wall member therebetween such that they are generally "T" shaped in cross-section, providing a perimeter channel on both sides, to accept the edges of the skins. The edges of the skins may be joined to the perimeter channel of the backbone by an adhesive, pressure fit, sonic welding, conventional welding, brazing, mechanical fasteners, or any other techniques appropriate to the materials used. The preferred joining technique is to use an epoxy adhesive joint.

The peripheral channels of the backbone effectively captures the outer edges and ends of the skin members, such that tensile loading of the skin-to-backbone attachment will be resisted by the material shear strength of the skin and backbone. Moreover, the loading borne by the adhesive will be primarily shear loading in the plane of attachment. For example, referring to the attachment of skin 30 to beam 41, the upper edge 30A of the skin is effectively "captured" between the backbone flanges 41A and 41C. The adhesive joint covers the surface area of contact between the upper and lower surfaces of the skin member edges (30A) and the perimeter channel formed by the inner surfaces of the backbone flanges (41A and 41C). Tensile loads on the adhesive joint will be opposed by the bulk material of the skin and beam.

In the preferred embodiment, the seat mast skins 34 and 36 extend from the center node 54 to the seat support node 57. The seat mast skin members 34 and 36 are provided with curved flaps 64 and 66 respectively, which extend downwardly beyond where the seat mast 18 meets the torque tube 12. The curved flaps closely conform to, and wrap around, the torque tube skin pieces 30 and 32. The bottom edges of the curved flaps 64 and 66 fit into the double-width channel provided in the lower corner point 98 of center node 54 as discussed above. The curved flaps provide structural bracing which strengthens the connection of the seat mast to the torque tube. It is obvious to one skilled in the art, however, that the flaps could be reduced in size or omitted altogether while still providing an acceptably strong bond between the seat mast skin pieces and the torque tube skin pieces by other methods.

The skin members 30, 32, 34 and 36 may be manufactured from any appropriate material such as fiber reinforced epoxy or plastic, injection-molded plastics, stamped or hydroformed metals, or other suitable materials and processes. Generally suitable materials have a high strength-to-weight ratio and high flex modulus.

As shown in FIGS. 4 and 5, the skin members may be formed with internal stiffening ribs 74 and 62. Stiffening ribs may be selectively provided at areas of high stress to provide additional axial stiffness, for example rib 74, or for additional torsional stiffness, for example rib 62. More particularly, it is contemplated that skin members formed from plastics may be formed with one or more ribs to provide increased strength and stiffness.

Due to the fact that the skin members are all positively affixed to the backbone, it is not necessary to provide a positive means of affixing the various skin pieces on one side to each other. However, if it is desired to positively affix the various skin members to each other, this could be accomplished by force fit, sonic welding, conventional welding, brazing, mechanical fasteners, adhesives, or any other techniques appropriate to the materials used. For example, it is preferred that the seat mast skin members 34 and 36 are adhered to the torque tube skin members 30 and 32.

The modular design of the frame of the present invention permits the use of different materials for the backbone and the skin members, thus allowing a design which takes the best advantage of the materials chosen and the configurations of the components. As best seen in FIG. 2, the preferred backbone is a generally planar structural element composed largely of I-beams. Therefore, the backbone is particularly strong in response to in-plane loads, such as those resulting from rider weight, shocks from jumps, or even head-on collisions with objects. The skin members, preferably having "C" shaped cross-sections, contribute strength in response to in-plane and out-of-plane loads. Thus, the frame of the present invention allows for the backbone and the skin members to be made from different materials to advantageously allow the overall frame to take the best advantage of the range of available structural materials.

Figure 12:
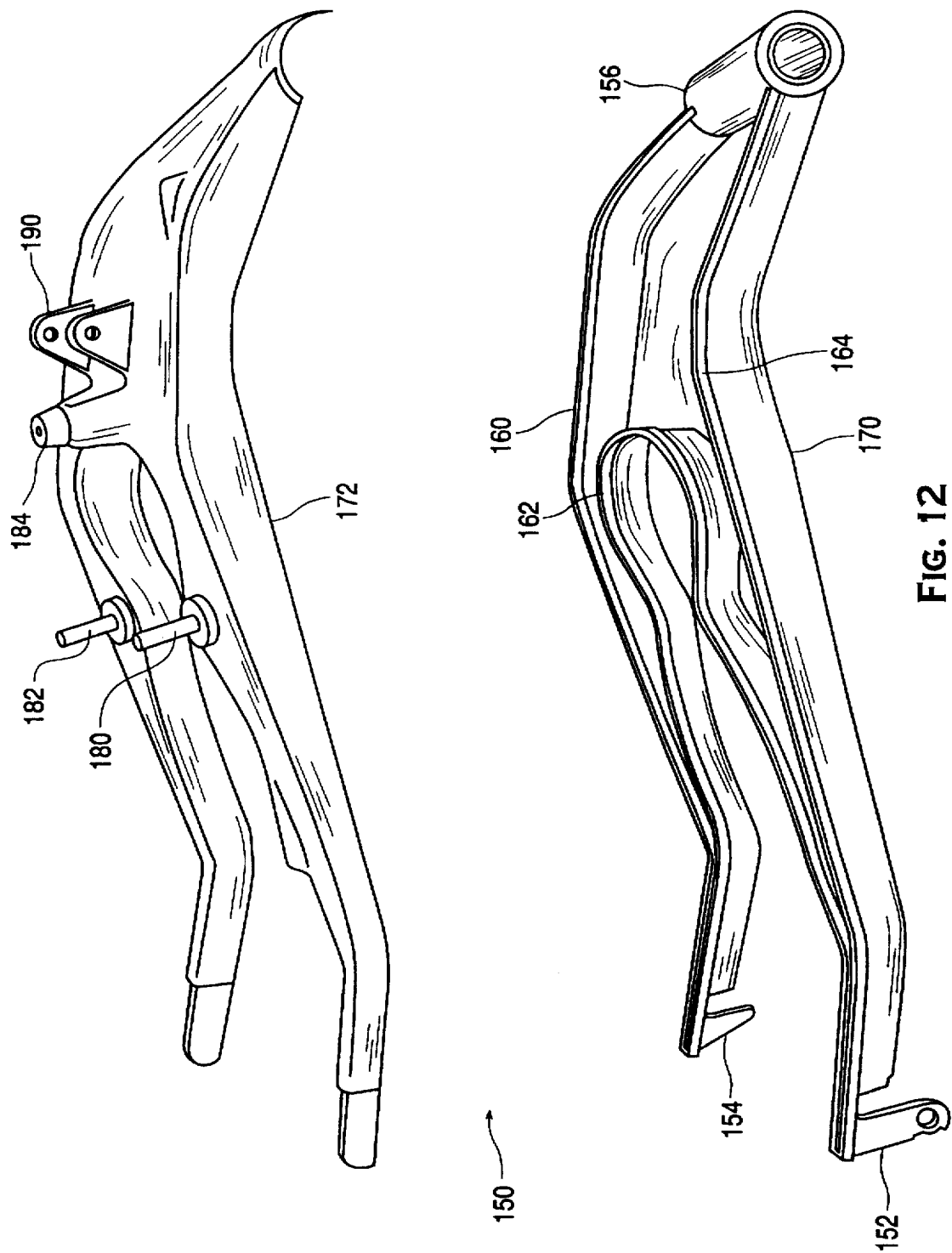
FIG. 12 is an exploded perspective of a swing arm according to the present invention.
Figure 13:
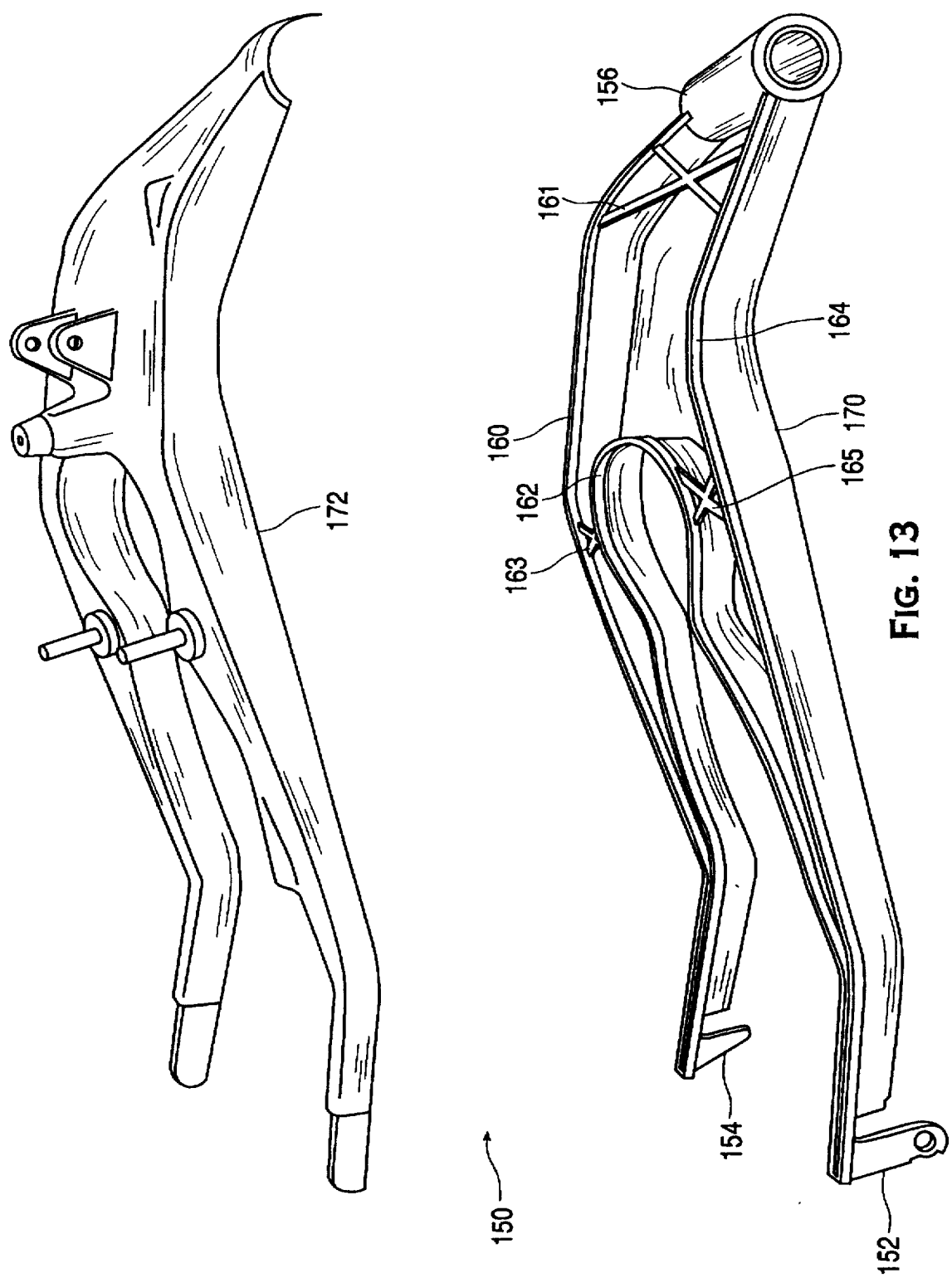
FIG. 13 is an exploded perspective of a second embodiment of the swing arm according to the present invention.

Referring now to FIGS. 12 and 13, another embodiment of a frame according to the present invention is shown. In this embodiment, the frame consists of a bicycle swing arm 150. The bicycle swing arm 150 includes a plurality of nodes 152, 154 and 156 interconnected by beam members 160, 162 and 164. The nodes 152 and 154 provide the interface between the swing arm 150 and the back wheel and the node 156 provides the interface for the swing arm 150 with a bicycle frame. Beam member 160 interconnects node 156 with node 154, beam member 162 interconnects node 154 with node 152 and beam member 164 interconnects node 152 with node 156.

The swing arm frame is further comprised of skin members 170 and 172. The skin members are interconnected into channels in the beam members 160, 162 and 164. Post members 180 and 182 and member 184 are provided on the skin member 172 for attaching the rear brake assembly to the swing arm member 150. The bracket members 190 are provided on the skin member 172 for attachment of the rear shock absorber to the swing arm 150 to provide the dampening of the shocks to the rear wheel.

The swing arm frame member 150 disclosed is FIG. 13 is substantially similar to that disclosed in FIG. 12. However, the frame member 150 is further comprised of truss members 161, 163 and 165 for interconnecting the beam members and providing additional stiffness and structural stability. The truss member 161 interconnects beam members 160 and 164, truss member 163 interconnects beam members 162 and 160 and truss member 165 interconnects beam members 164 and 162.

Figure 14:
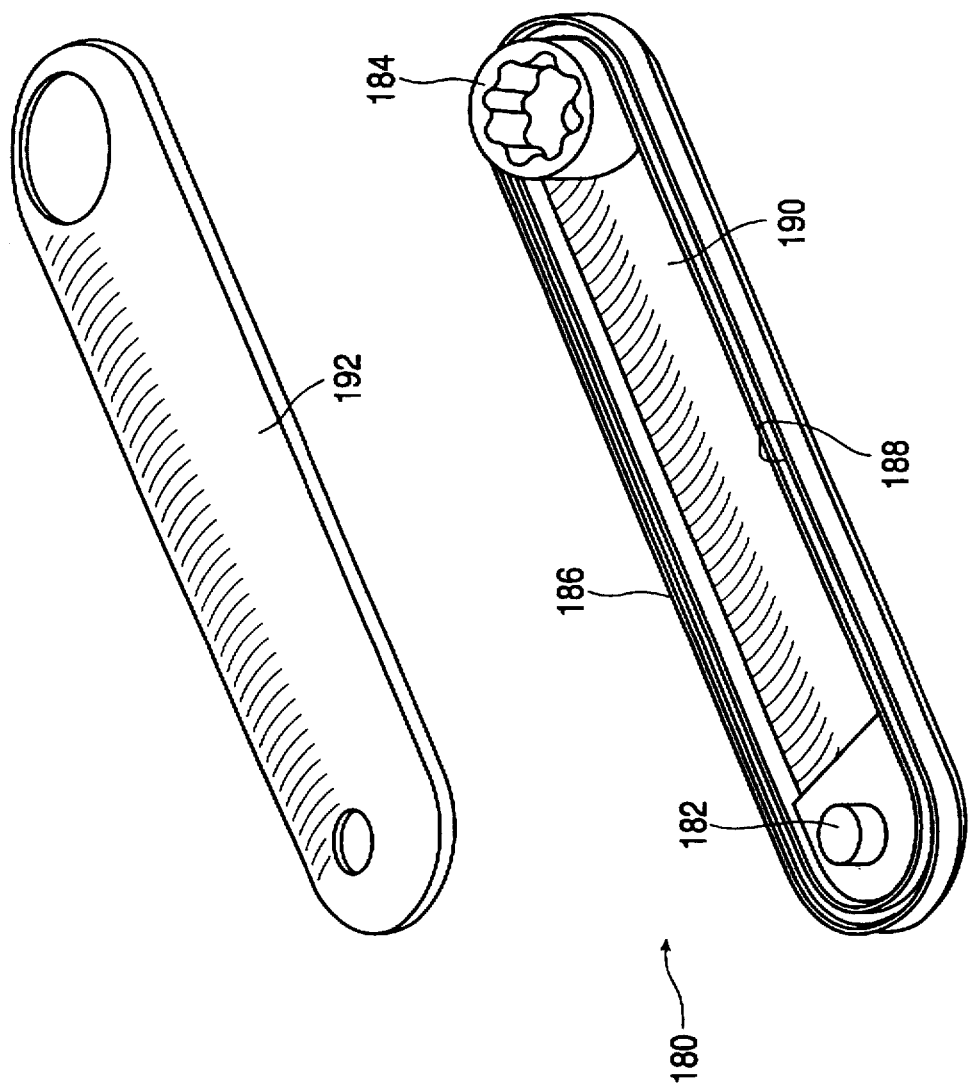
FIG. 14 is an exploded perspective of a pedal crank according to the present invention.
Figure 15:
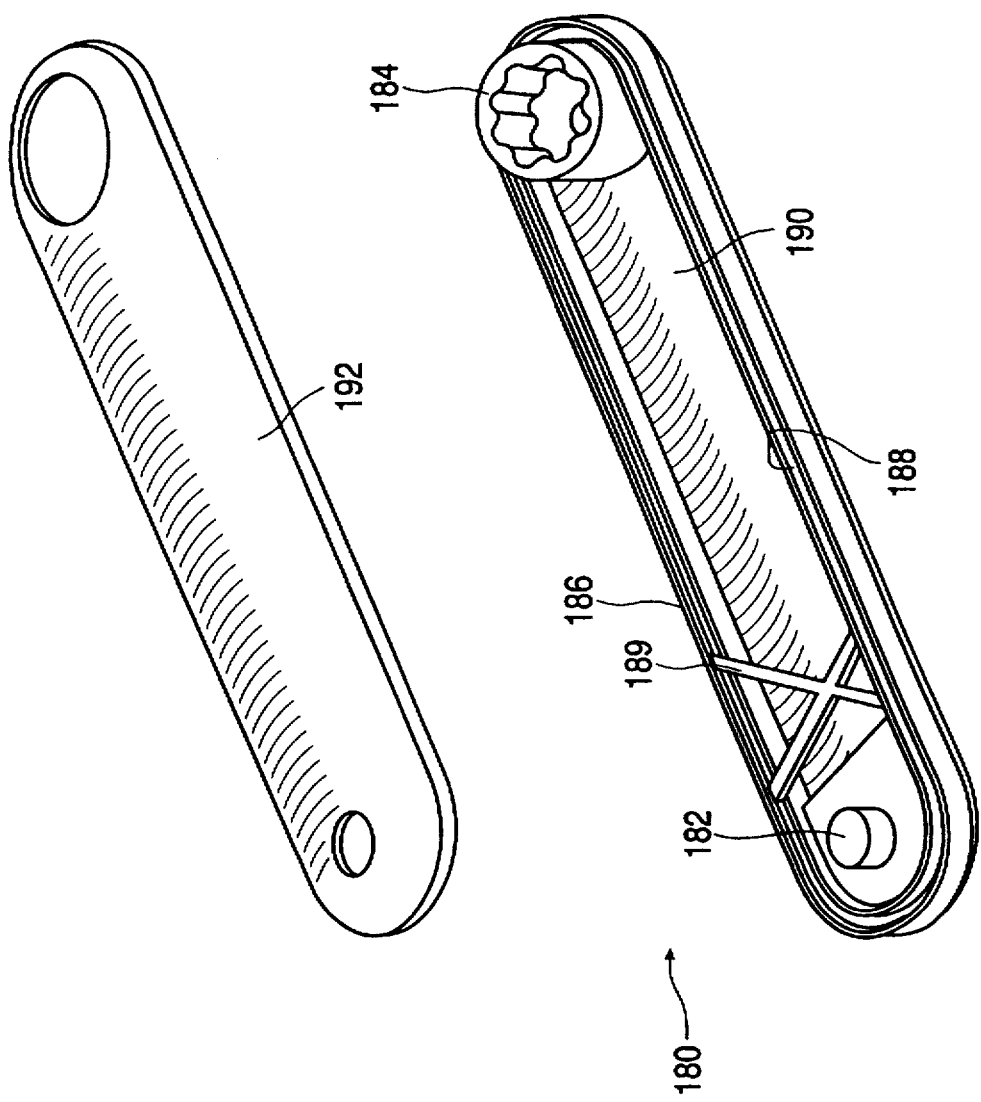
FIG. 15 is an exploded perspective of a second embodiment of the pedal crank according to the present invention.

Now referring to FIGS. 14 and 15, a further embodiment of a frame member according to the present invention is disclosed as a pedal crank arm 180. The pedal crank arm 180 is comprised of two nodes members 182 and 184. The node member 182 interconnects the pedal crank arm 180 to the bicycle pedal and the node member 184 interconnects the pedal crank arm 180 to the crank assembly. Interconnecting the node members 182 and 184 are beam members 186 and 188. The frame is also comprised of two skin members 190 and 192 which are received in channels in the node members 182 and 184 and beam members 186 and 188.

The pedal crank arm frame 180 shown in FIG. 15 is substantially similar to the one shown in FIG. 14 but is further comprised of truss members 189 which interconnect the beam members 186 and 188 for additional strength and structural stiffness.

Figure 16:
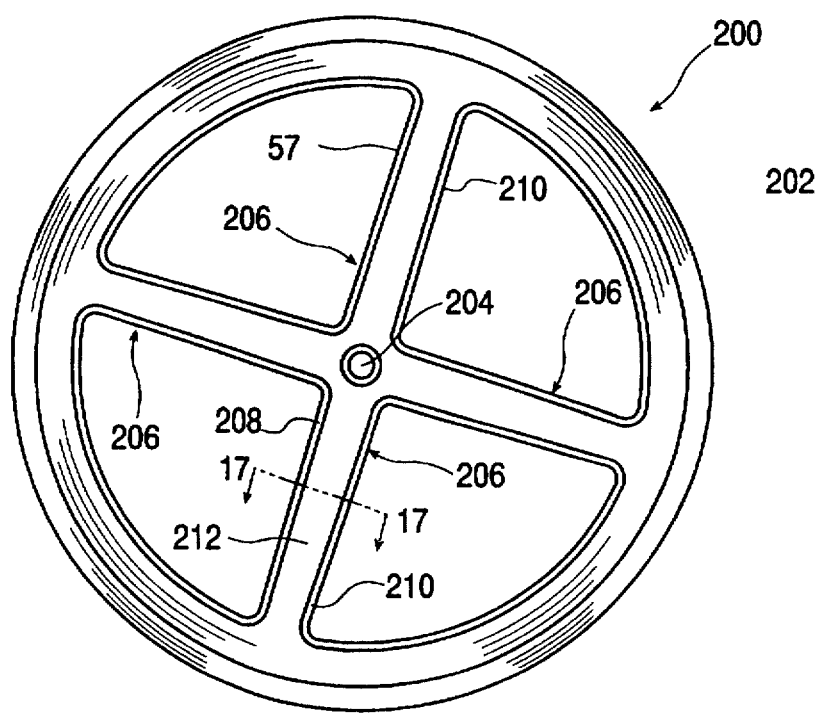
FIG. 16 is a plan view of a wheel according to the present invention.
Figure 17:
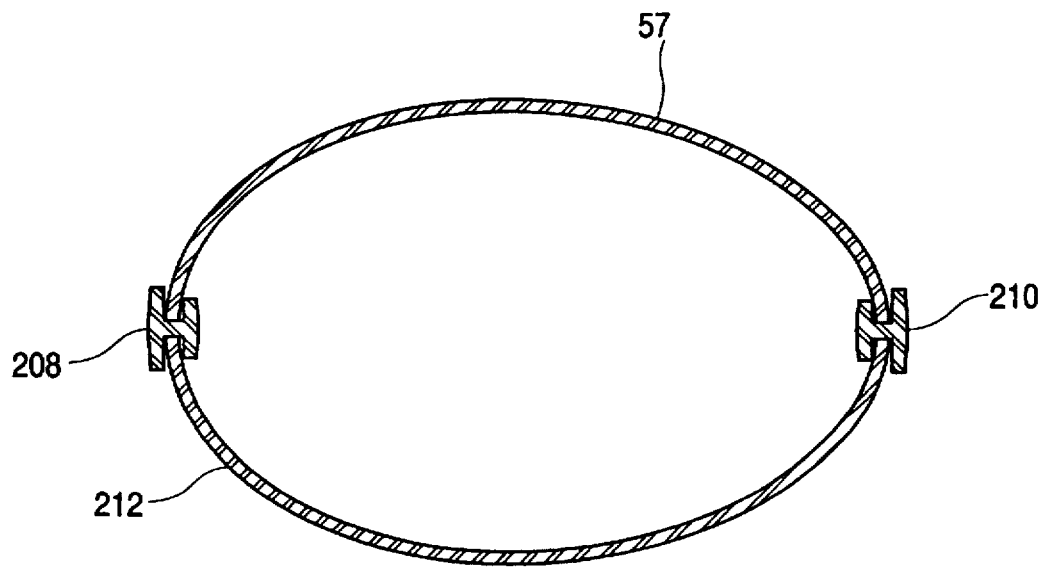
FIG. 17 is an enlarged sectional view of the wheel spoke taken along line 17—17 of FIG. 16.

Referring now to FIGS. 16 and 17, another embodiment of a frame according to the present invention is shown. In this embodiment, the frame is a wheel 200, which is comprised of a rim node 202 and an axle hub node 204 and a plurality of spokes 206 interconnecting the same. The frame is similarly comprised of a backbone comprised of nodes 202 and 204 with a plurality of beams 208 and 210 having channels therein extending between the nodes 202 and 204. The rim node 202 interconnects the wheel 200 with a tire and the axle hub node 204 interconnects the wheel 200 with a wheel axle. The wheel 200 is further comprised of two skin members 212 and 214, which are received within the channels of the beam members 208 and 210 to provide the frame structure.

The advantageous features of the frame of the present invention is not limited to bicycles. Although the detailed description refers to the frame in the form of a bicycle frame and bicycle components, many other applications are readily apparent. Examples of other applications include, but are not limited to, motorized bicycles, motorcycles, wheelchairs and other human-powered vehicles, as well as structures that transmit in-plane and out-of-plane loads between a plurality of components.

While specific embodiments of the invention have been described and shown in the drawings, further variations will be apparent to those skilled in the art, and the invention should not be construed as limited to the specific forms shown and described. The scope of the invention is to be determined solely by the following claims.

What is claimed is:

1. A frame for maintaining two components in spacial relation, comprising:
   a) a first node member for interconnecting with a first component, the first node member having first opposing node channels;
   b) a second node member for interconnecting with a second component;
   c) a first plurality of beam members extending between and interconnected with the first and second node members the beam members having opposing channels; and
   d) a plurality of skin members extending between the first and second node members, said skin members having outer edges secured in the beam channels and node channels.

2. The frame of claim 1 wherein the skin members are secured to opposing sides of the beam members.

3. The frame of claim 2 wherein the beam channels extend along substantially the entire length of the beams.

4. A frame for maintaining two components in spacial relation, comprising:
   a) a first node member for interconnecting with a first component;
   b) a second node member for interconnecting with a second component;
   c) a first plurality of beam members extending between the first and second node members, the beam members having opposing channels;
   d) a plurality of skin members extending between the first and second node members, said skin members having outer edges secured in the beam channels on opposing sides of the beam members; and
   e) the first and second node members include opposing node channels for receiving outer edges of the skin members, such that the frame has beam and node channels that extend substantially around the entire periphery of the frame.

5. The frame of claim 2 wherein the beam members are substantially I-shaped.

6. The frame of claim 5 wherein the cross-section of the skin members is substantially C-shaped, with the edges of the C being secured in the beam channels.

7. The frame of claim 6 wherein the skin members are substantially adhered to the channels in the beam members.

8. The frame of claim 1 further comprising at least one truss member interconnecting at least two of the beam members for providing additional structural stiffness.

9. The frame of claim 1 wherein the node members further include a plurality of arm members for engaging with the beam members.

10. The frame of claim 7 wherein the node members include a plurality of arms, the arms and the beam members partially overlap to form an overlap section such that overlap channels are formed by a portion of the arms and a portion of the beam members in the overlap section.

11. A frame for maintaining two components in spacial relation, comprising:
   a) a first node member for interconnecting with a first component and having a first channel formed therein;
   b) a second node member for interconnecting with a second component and having a second channel formed therein;
   c) a first beam member extending between and interconnected with the first and second node members, the beam member having opposing channels; and d) a plurality of skin members extending between the first and second node members, said skin members having outer edges secured in the beam channels and the first and second node channels.

12. The frame of claim 11 wherein the skin members are secured to opposing sides of the beam member.

13. The frame of claim 12 wherein the beam channels extend along substantially the entire length of the beam.

14. The frame of claim 11 wherein the beam member is substantially I-shaped.

15. The frame of claim 12 wherein the cross-section of the skin members is substantially C-shaped, with the edges of the C being secured in the beam channels.

16. The frame of claim 15 wherein the skin members are substantially adhered to the channels in the beam member.

17. The frame of claims 1 or 11 wherein the first node member is comprised of a plurality of bearing races for interconnecting with steering components for a bicycle and the second node member is comprised of means for attaching a crank assembly for a bicycle.

18. The frame of claim 17 further comprising a third node for supporting a bicycle seat post and a second plurality of beam members extending between the third node and the first beam members.

19. The frame of claim 18 further comprising a forth node member for supporting one end of a bicycle rear shock, the forth node member forming a junction between the first beam members and the second beam members.

20. The frame of claims 1 or 11 wherein the first node member is comprised of means for pivotally connecting the frame to a bicycle frame and the second node member is comprised of means for attaching the frame to a bicycle wheel.

21. A frame for maintaining two components in spacial relation, comprising:
  a first node member for interconnecting with a first component;
  a) a second node member for interconnecting with a second component;
  b) a first beam member extending between the first and second node members, the beam member having opposing channels;
  a plurality of skin members extending between the first and second node members, said skin members having outer edges secured in the beam channels;
  c) the first node member includes means for connecting the frame to a bicycle pedal; and
  d) the second node member includes means for connecting the frame to a bicycle crank assembly.

22. The frame of claims 1 or 11 wherein the first node member is comprised of a wheel rim for receiving a tire and the second node member is comprised of a wheel axle hub for receiving a wheel axle.

23. A frame assembly comprising:
  a) a backbone unit comprising a steering support region having a steering support region channel therein, a seat support assembly region, a bottom bracket region, a first plurality of beams extending from and interconnecting the steering support region to the bottom bracket region, and a second plurality of beam members extending from a point between the ends of the first beam members to the seat support region, the first and second beam members having opposing channels therein; and
  b) opposing skin members having outer edges; wherein the skin members are configured and dimensioned such that their outer edges fit into the opposing channels in the first and second beam members and in the steering support region channel.

24. The bicycle frame assembly of claim 23, wherein the steering support region, the seat support region and the bottom bracket region are comprised of arm members for connecting to the beam members.

25. The bicycle frame assembly of claim 24, wherein the connections between the arm members and beam members comprise overlapping joints, thereby providing increased strength and contacting surface area.

26. The bicycle frame assembly of claim 23 wherein the skin members are comprised of torque tube skin members with outer edges that fit into the channels of the first beam members and seat mast skin members with outer edges that fit into the channels of the second beam members.

27. The bicycle frame assembly of claim 26, wherein one end of the seat mast skin members of a seat mast are provided with curved flaps that are shaped to substantially conform to and wrap around the outside of the torque tube skin members of a torque tube.

28. The bicycle frame assembly of claim 23, further comprising means for affixing the edges of the skin members within the channels of the beam members.

29. The bicycle frame assembly of claim 28, wherein the means for affixing comprises epoxy adhesive.

30. A seat support assembly for attaching a bicycle seat post to a bicycle frame and preventing vertical and rotational motion of the seat post, comprising:
  a) a plate member integrally formed with the bicycle frame;
  b) at least one arm member extending from the plate member for abutting the seat post;
  c) a plurality of fingers extending from the arm member for positioning the seat post; and
  d) at least one clamp formed substantially as a ring extending from the arm, the clamp looping around and frictionally engaging the seat post to the fingers.

31. The seat support assembly of claim 30 further comprising a second arm member being spaced apart from the first arm member and extending from the plate member for abutting the seat post and a second band clamp for looping around and frictionally engaging the seat post.

32. The seat support assembly of claim 31 further comprising a plurality of attachment members extending from the opposite side of the plate member from the arm members for attaching the seat support assembly to the bicycle frame.

33. The seat support assembly of claim 31 further comprising a plurality of finger members extending from each arm member to engage the surface of the seat post.

34. The seat support assembly of claim 30 further comprising means for tensioning the band clamp around the seat post.

35. The seat support assembly of claim 34 wherein the tensioning means is comprised of a barrel nut received in a loop in the end of the band clamp and a screw threaded into the nut for tightening the clamp.

36. The seat support assembly of claim 31 further comprising means for tensioning the band clamps around the seat post.

37. The seat support assembly of claim 36 wherein the tensioning means is comprised of a barrel nut received in a loop in the end of the band clamps and a screw threaded into the nut for tightening the clamps.

* * * * *